(12) United States Patent
Huang et al.

(10) Patent No.: US 10,695,977 B2
(45) Date of Patent: Jun. 30, 2020

(54) APPARATUS AND METHOD FOR ADJUSTING AND CONTROLLING THE STACKING-UP LAYER MANUFACTURING

(71) Applicant: Industrial Technology Research Institute, Hsin-Chu (TW)

(72) Inventors: Wei-Chin Huang, Tainan (TW); Chuan-Sheng Zhuang, Taichung County (TW)

(73) Assignee: INDUSTRIAL TECHNOLOGY RESEARCH INSTITUTE, Hsin-Chu (TW)

( * ) Notice: Subject to any disclaimer, the term of this patent is extended or adjusted under 35 U.S.C. 154(b) by 320 days.

(21) Appl. No.: 15/850,096

(22) Filed: Dec. 21, 2017

(65) Prior Publication Data

US 2018/0117839 A1 May 3, 2018

Related U.S. Application Data

(62) Division of application No. 14/477,249, filed on Sep. 4, 2014, now Pat. No. 9,884,455.

(30) Foreign Application Priority Data

Dec. 20, 2013 (TW) .............................. 102147539 A

(51) Int. Cl.
*B29C 35/02* (2006.01)
*B29C 64/153* (2017.01)
(Continued)

(52) U.S. Cl.
CPC .......... *B29C 64/153* (2017.08); *B22F 3/1055* (2013.01); *B29C 64/20* (2017.08);
(Continued)

(58) Field of Classification Search
CPC .................................................. B29C 64/153
See application file for complete search history.

(56) References Cited

U.S. PATENT DOCUMENTS 4,544,985 A 10/1985 Metz et al.
4,938,816 A * 7/1990 Beaman ................. B33Y 10/00
156/62.2

(Continued)

FOREIGN PATENT DOCUMENTS

CN 103068516 4/2013
CN 103088275 5/2013
(Continued)

OTHER PUBLICATIONS

Taiwan Patent Office, "Office Action," dated Apr. 21, 2015.
(Continued)

*Primary Examiner* — Galen H Hauth
(74) *Attorney, Agent, or Firm* — WPAT, PC

(57) ABSTRACT

An apparatus of adjusting and controlling the stacking-up layer manufacturing comprises a target, a powder providing unit, an energy generating unit, and a magnetism unit. The powder providing unit is coupled on a top of the target. The energy generating unit is also coupled on the top of the target. The powder providing unit provides a powder to a surface of the target. The energy generating unit provides the energy beam to selectively heat the powder on the surface of the target to form a melted or sintered powder layer. The magnetism unit provides a magnetic field to control the solidification of the melted or sintered powder layer.

15 Claims, 14 Drawing Sheets

(51) Int. Cl.

| | | |
|---|---|---|
| *B22F 3/105* | (2006.01) | |
| *C04B 35/64* | (2006.01) | |
| *C04B 35/653* | (2006.01) | |
| *B29C 64/20* | (2017.01) | |
| *B29K 101/00* | (2006.01) | |
| *B29K 105/00* | (2006.01) | |
| *B33Y 30/00* | (2015.01) | |
| *B33Y 10/00* | (2015.01) | |

(52) U.S. Cl.
CPC .......... *C04B 35/64* (2013.01); *C04B 35/653* (2013.01); *B22F 2003/1057* (2013.01); *B29K 2101/00* (2013.01); *B29K 2105/251* (2013.01); *B33Y 10/00* (2014.12); *B33Y 30/00* (2014.12); *Y02P 10/295* (2015.11)

(56) References Cited

U.S. PATENT DOCUMENTS

| | | |
|---|---|---|
| 6,229,125 B1 | 5/2001 | Livshiz et al. |
| 7,341,765 B2 | 3/2008 | Branagan et al. |
| 7,708,844 B2 | 5/2010 | Muramatsu et al. |
| 8,124,192 B2 | 2/2012 | Paasche et al. |
| 8,133,329 B2 | 3/2012 | Wakade |
| 8,414,281 B2 | 4/2013 | Schleiss et al. |
| 2004/0087116 A1 | 5/2004 | Nakayama |
| 2006/0003095 A1 | 1/2006 | Bullen et al. |
| 2007/0107467 A1 | 5/2007 | Miwa et al. |
| 2008/0292862 A1* | 11/2008 | Filippov ................ B29C 71/00 428/304.4 |
| 2009/0047439 A1 | 2/2009 | Withers |
| 2010/0275655 A1 | 11/2010 | Kawamura |
| 2011/0259922 A1 | 10/2011 | Kelly et al. |
| 2012/0006085 A1 | 1/2012 | Johnson et al. |
| 2012/0329659 A1 | 12/2012 | Holcomb |
| 2013/0056672 A1* | 3/2013 | Johnston ................ B33Y 10/00 252/62.54 |
| 2013/0112672 A1 | 5/2013 | Keremes et al. |

FOREIGN PATENT DOCUMENTS

| | | |
|---|---|---|
| DE | 202004007214 | 8/2004 |
| EP | 2565022 | 3/2013 |
| TW | I242606 | 11/2005 |
| TW | 200706687 | 2/2007 |
| TW | 201302461 | 1/2013 |
| WO | WO2012164015 | 12/2012 |
| WO | WO2013010108 | 1/2013 |

OTHER PUBLICATIONS

European Patent Office, "European Search Report," dated Jun. 9, 2015.

X. W. Bai , H. O. Zhang, G. L. Wang, "Electromagnetically confined weld-based additive manufacturing," The Seventeenth CIRP Conference on Electro Physical and Chemical Machining (ISEM), published by Elsevier B.V., 2013, pp. 515-520.

Takeshi Nakamoto and Shinya Kojima, "Layered Thin Film Micro Parts Reinforced with Aligned Short Fibers in Laser Stereolithography by Applying Magnetic Field," Journal of Advanced Mechanical Design, Systems, and Manufacturing, vol. 6, No. 6, 2012, pp. 849-858.

Selective laser sintering of amorphous metal powder P. Fischer, A.Blatter, V.Romano, H.P.Weber Applied Physics A 2005 p. 489-492.

Processing metallic glasses by selective laser Materials Today Simon Pauly, Lukas Lober , Romy Petters , Mihai Stoica, Sergio Scudino, Uta Kuhn, Jurgen Eckert MaterialsToday 2013 p. 37-41.

Microstructural Analysis of a Laser-Processed Zr-Based Bulk Metallic Glass Sun, H.; Flores, K. M. Metallurgical and Materials Transactions A 2010 p. 1752-1757.

Laser welding of Zr45Cu48Al7 bulk glassy alloy B. Li, Z.Y. Li, J.G. Xiong, L. Xing, D. Wang, Y. Li Journal of Alloys and Compounds 2006 p. 118-121.

Electromagnetic vibration process for producing bulk metallic glasses Takuya Tamura1*, Kenji Amiya2, Rudi S. Rachmat1, Yoshiki Mizutani1 and Kenji Miwa nature materials 2005 p. 289-292.

Effect of Electromagnetic Vibrations on Fe—Co—B—Si—Nb Bulk Metallic Glasses Takuya Tamura*, Daisuke Kamikihara, Naoki Omura and Kenji Miwa Materials Transactions 2007 p. 53-57.

Metal Fabrication by Additive Manufacturing Using Laser and Electron Beam Melting Technologies. Murr LE, Gaytan SM, Ramirez DA, Martinez E, Hernandez J, Amato KN, et al. Journal of Materials Science & Technology. 2012;28:1-14.

Selective laser sintering of a stainless steel powder Hauser C. University of Leeds; 2003.

Laser solid forming Zr-based bulk metallic glass. Yang G, Lin X, Hu Q, Ma L, Li J, et al. Intermetallics. 2012;22:110-5 0966-9795.

* cited by examiner

APPARATUS AND METHOD FOR ADJUSTING AND CONTROLLING THE STACKING-UP LAYER MANUFACTURING

CROSS REFERENCE TO RELATED APPLICATION

The present application is based on, and claims priority from, Taiwan (International) Application Serial Number 102147539, filed on Dec. 20, 2013, the disclosure of which is hereby incorporated by reference herein in its entirety.

TECHNICAL FIELD

The present disclosure relates to an apparatus and a method for adjusting and controlling the stacking-up layer manufacturing, and more particularly to the apparatus and the method for adjusting and controlling the material microstructure of stacking-up layer manufacturing product.

BACKGROUND

Conventional manufacturing methods such as the casting can only provide products with fixed configurations. If there is a need for improving material properties (strength and surface hardness for example) of the product to meet various requirements, a further relevant heat treatment can be applied so as to form a homogeneous internal texture or to provide a controllable surface. If the need is to modify the configuration of the object, then some specific manufacture methods can also be available already in the art.

The stacking-up layer or additive manufacturing method is a method for producing products with complicated configurations. Currently, among various additive manufacturing methods, powder bed fusion and direct energy deposition are two major application types of the metal additive manufacturing. The powder bed fusion of the additive manufacturing process comprises selective laser sintering (SLS), selective laser melting (SLM), direct metal laser sintering (DMLS), electron beam melting (EBM), and other relative techniques of powder bed fusion forming method. The direct energy deposition of the additive manufacturing process comprises laser engineering net shaping (LENS), laser metal deposition (LMD), 3D laser cladding, and other relative techniques of direct energy deposition forming method.

In all the aforesaid additive manufacture methods, during the solidification process, the phase change of the material between the solid state and the liquid state and the crystallizing mechanism may greatly be affected by the energy of the heating source (such as laser or electron beam) and the scanning speed. If provided energy is excessive, material may be vaporized. On the other hand, if provided energy is insufficient, the melting or sintering process is insufficient. In addition, while the scanning speed of the energy beams is too fast or too slow, quality of the additive manufacturing may be degraded. Therefore, optimal process parameters for the current additive manufacturing, or said as the stacking-up layer manufacturing, are limited in a specific range, and the crystallization (such as the crystal size and the crystal direction) of the material microstructure is usually uncontrollable by the variation of process parameters.

SUMMARY

The present disclosure is to provide an apparatus for adjusting and controlling the stacking-up layer manufacturing. The apparatus comprises:

a target;

a powder providing unit, coupled on a top of the target, providing a powder to a surface of the target;

an energy generating unit, coupled also on the top of the target, providing an energy beam to selectively heat the powder on the surface of the target to form a melted or sintered powder layer; and a magnetism unit, coupled also on the top of the target, providing a magnetic field to control solidification of the melted or sintered powder layer.

This disclosure further provides a method for adjusting and controlling the stacking-up layer manufacturing. The method comprises the steps of:

providing a powder onto a surface of a target thereon;

directing an energy beam onto the powder on the surface of the target so as to melt or sinter a particular area of the powder to form a melted or sintered powder layer;

applying a magnetic field to the melted or sintered powder layer so as to control solidification of the melted or sintered powder layer and further to form a corresponding solidified layer; and performing repeatedly the aforesaid three steps till a 3D product is formed by a sequence stacking with the solidified layers.

This disclosure further provides a control method for an apparatus for adjusting and controlling the stacking-up layer manufacturing, in which the apparatus for adjusting and controlling the stacking-up layer manufacturing comprises a target, a powder providing unit for providing a powder onto the target, an energy generating unit for providing an energy beam and a magnetism unit for generating a magnetic field. The control method comprises the steps of:

providing the powder onto a surface of the target;

directing the energy beam onto the powder on the surface of the target so as to melt or sinter a particular area to form a melted or sintered powder layer;

applying the magnetic field to the melted or sintered powder layer so as to control a solidification of the melted or sintered powder layer and further to form a corresponding solidified layer; and performing repeatedly the aforesaid three steps till a 3D product is formed by a sequence stacking with the solidified layers.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DETAILED DESCRIPTION

Figure 1:
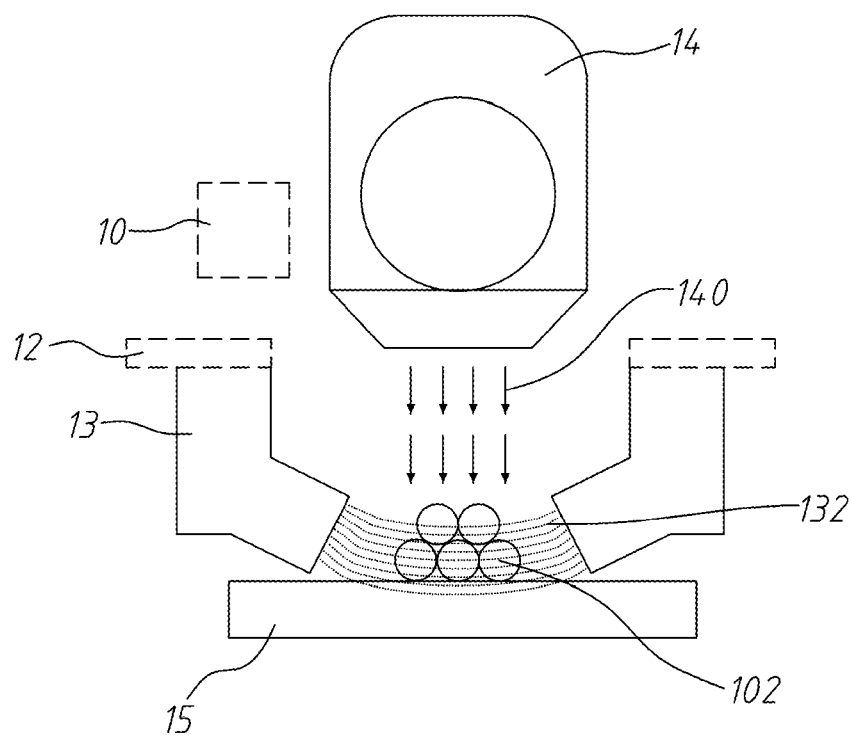
FIG. 1 is a schematic view of a first embodiment of the apparatus for adjusting and controlling the stacking-up layer manufacturing of this disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
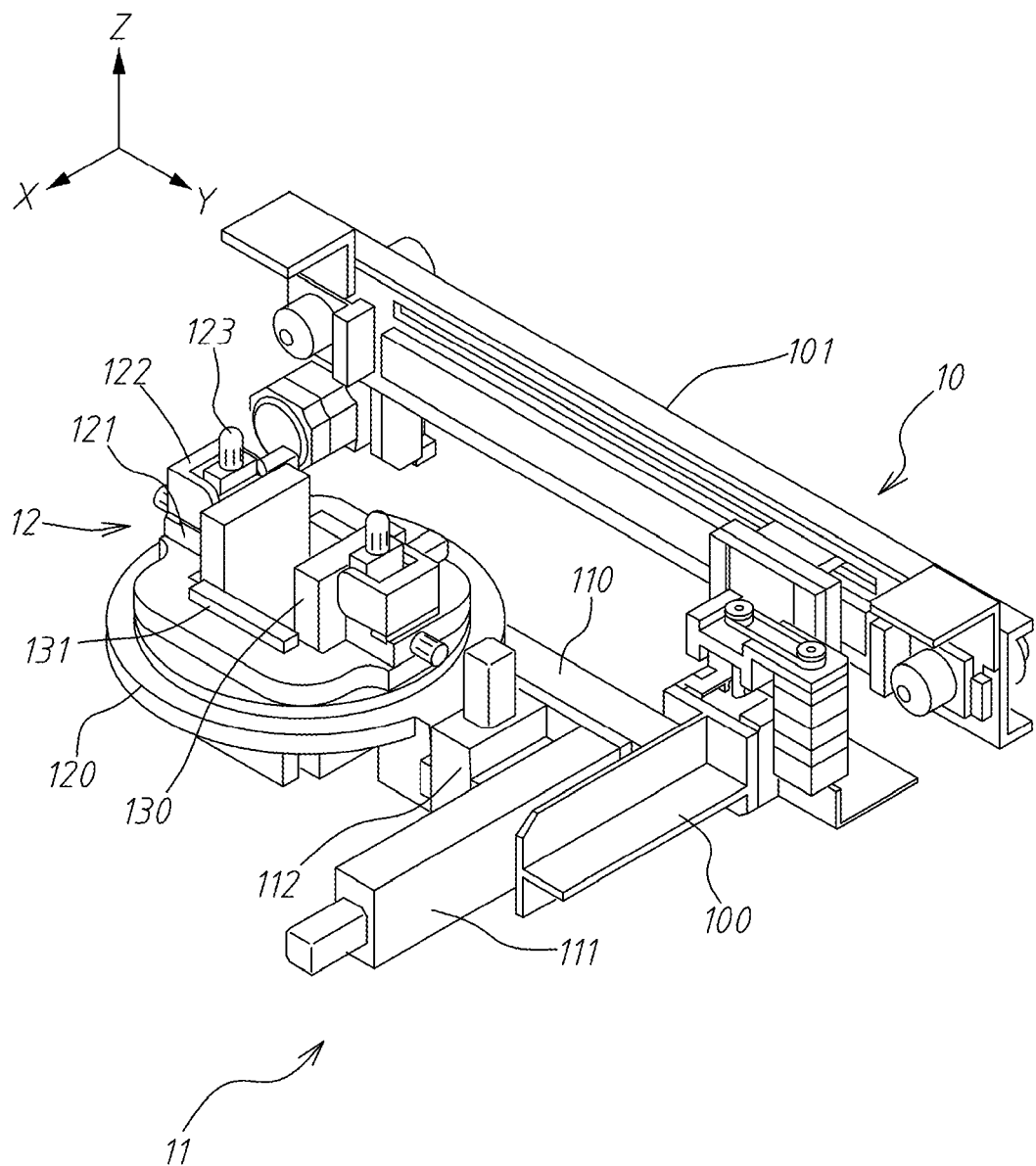
FIG. 2 is a schematic perspective view of FIG. 1.

Referring now to FIG. 1 and FIG. 2, a schematic view and a corresponding perspective view of a first embodiment of the apparatus for adjusting and controlling the stacking-up layer manufacturing are shown, respectively. The first embodiment may comprise a powder providing unit 10, a magnetism unit 13, an energy generating unit 14 and a target 15.

In this disclosure the target 15 may be a plate, a platform, a semi-finished product, or any the like. Also, the target 15 may be stationary or mobile.

The powder providing unit 10 may be coupled on a top of the target 15. The powder providing unit 10 may provide a powder 102 to the surface (top surface) of the target 15 by spraying, depositing, rolling, leveling, laying, or a combination of at least two of the foregoing. In addition, the powder providing unit 10 may be structured as one selected from a group consisting of a knife-shape material providing module, a hopper material providing module, a spray material providing module, a feed-drum material providing module, and any the like. The foregoing material providing modules may be utilized to control the laying, depositing, rolling, leveling, or spraying of the powder.

As shown in FIG. 2, the powder providing unit 10 may have a knife-shape material providing module 100 and a first Y-axis displacement module 101. In this first embodiment, the knife-shape material providing module 100 and the first Y-axis displacement module 101 demonstrate simply an exemplary example for the powder providing unit, and it is understood that the embodying of the powder providing unit 10 shall not be limited to this pair of the knife-shape material providing module 100 and the single-axis displacement module 101. Anyway, in this embodiment, first Y-axis displacement module 101 may be coupled with the knife-shape material providing module 100 so as to allow the knife-shape material providing module 100 to perform a reciprocating motion along the Y axis.

Figure 3:
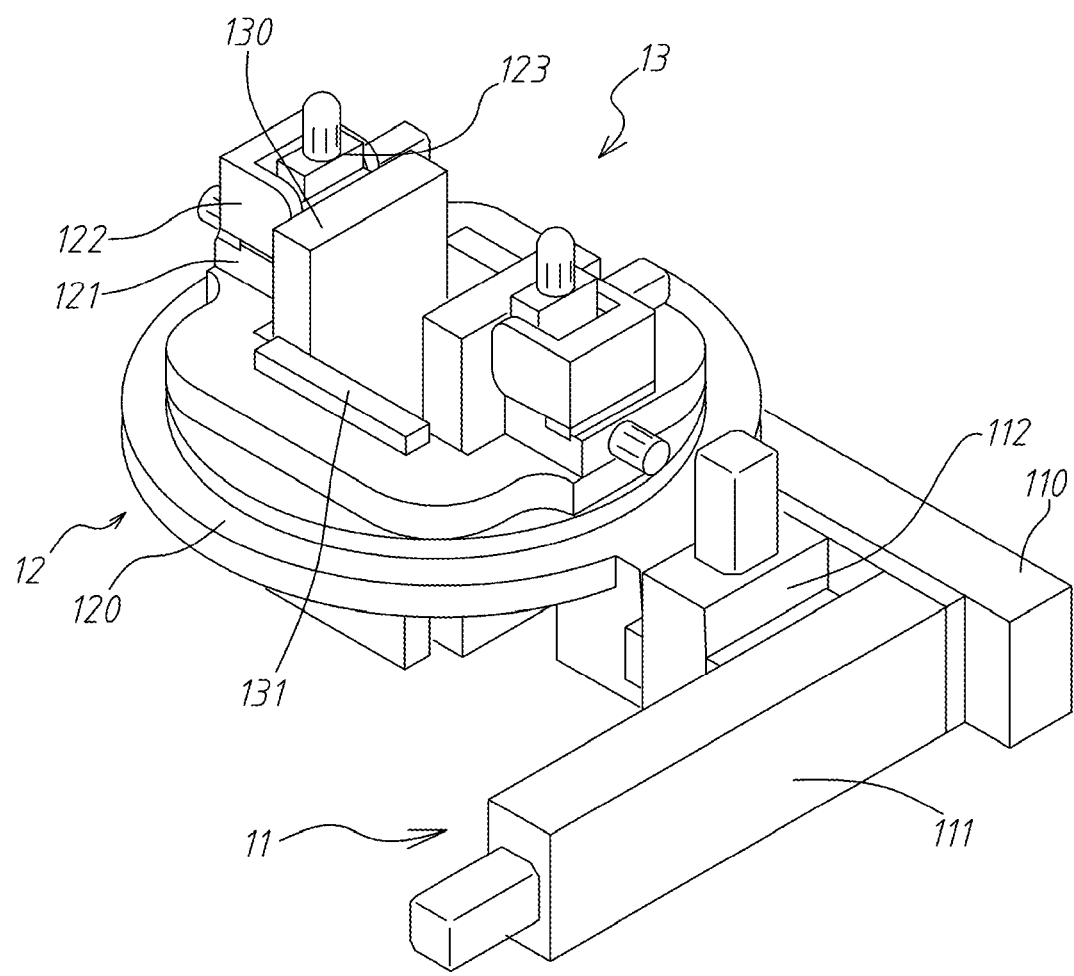
FIG. 3 is a schematic enlarged view of the displacement unit 11, the adjustment module 12 and the magnetism unit 13 of FIG. 2.
Figure 4:
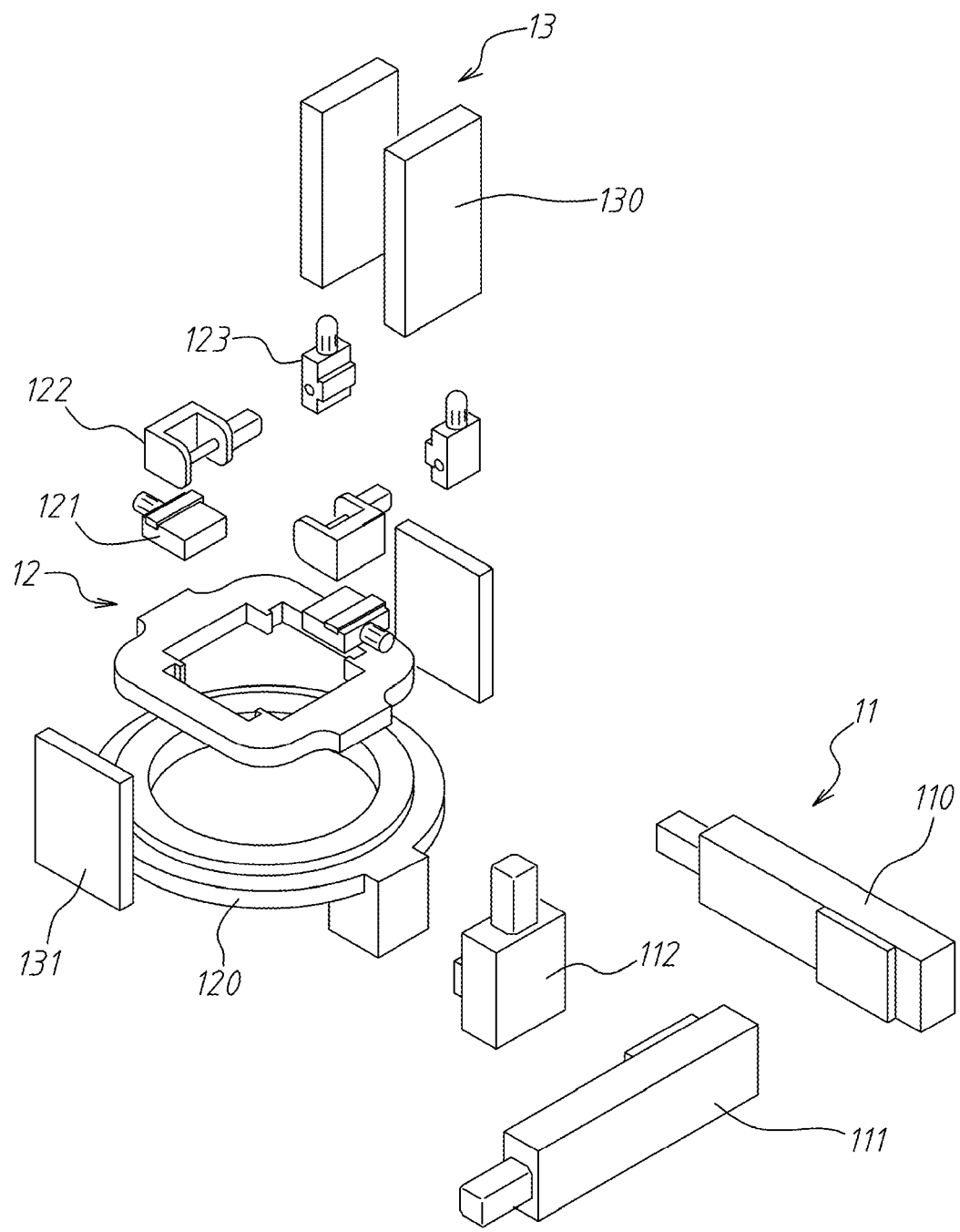
FIG. 4 is a schematic exploded view of FIG. 3.

Referring to FIG. 2, FIG. 3 and FIG. 4, the apparatus for adjusting and controlling the stacking-up layer manufacturing may further comprise a displacement unit 11 that may comprise a second Y-axis displacement module 110, an X-axis displacement module 111 and a Z-axis displacement module 112.

The second Y-axis displacement module 110 may be coupled with the knife-shape material providing module 100, the X-axis displacement module 111 may be coupled with the second Y-axis displacement module 110, and the Z-axis displacement module 112 may be coupled with the X-axis displacement module 111.

The apparatus for adjusting and controlling the stacking-up layer manufacturing may further comprise an adjustment module 12 that may comprise a turning module 120, at least one protrusion module 121, at least one angular adjustment modules 122 and at least one tilt modules 123.

The turning module 120 may be coupled with the Z-axis displacement module 112. The protrusion module 121 may be coupled on top of the turning module 120. It may have two protrusion modules 121, and may be located oppositely to each other. It may have two angular adjustment modules 122, and may be coupled on top of the respective protrusion module 121. It may have two tilt modules 123, and may be coupled top to the respective angular adjustment module 122.

The magnetism unit 13 for generating a magnetic field 132 may have a first magnetic pair 130, or a combination of the first magnetic pair 130 and a second magnetic pair 131. In this embodiment, the magnetism unit 13 may provide a magnetic field 132, as shown in FIG. 1. In other embodiments, the magnetism unit 13 may alter the arrangement of the first magnetic pair 130 and the second magnetic pair 131, and may provide a static magnetic field, an alternative magnetic field or a pulse magnetic field. Details for these would be elucidated in later sections.

The first magnetic pair 130 may be an electromagnetic member having two electromagnetic poles, or at least two electromagnetic members that each of the at least two electromagnetic members may be coupled with the respective tilt module 123.

Figure 5:
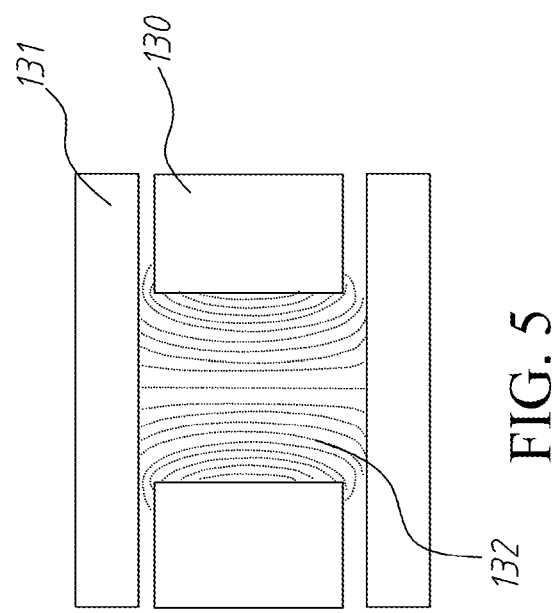
FIG. 5 is a schematic view of the magnetism unit 13 of the first embodiment of this disclosure.

The second magnetic pair 131 may be an electromagnetic member having two electromagnetic poles, or at least two electromagnetic members for helping to vary the strength of the first magnetic pair 130. In addition, the first magnetic pair 130 and the second magnetic pair 131 may be coupled to the turning module 120. The first magnetic pair 130 and the second magnetic pair 131 may be integrally arranged in a surrounding manner or any manner the like. In this embodiment, the surrounding manner may be performed by a rectangular arrangement, referred to FIG. 5. The magnetic field 132 in this embodiment may be located in the area surrounded by the first magnetic pair 130 and the second magnetic pair 131.

As mentioned above, the second Y-axis displacement module 110 may allow the adjustment module 12 to perform reciprocating motion along the Y axis. Similarly, the X-axis displacement module 111 may allow the adjustment module 12 to perform another reciprocating motion along the X axis, and the Z-axis displacement module 112 may allow the adjustment module 12 to perform a respective reciprocating motion along the Z axis.

The turning module 120 may allow the magnetism unit 13 to rotate an angle about the Z axis.

The protrusion module 121 may adjust the spacing between the two electromagnetic poles of the first magnetic pair 130; i.e. to control the distance between the two electromagnetic members.

The angular adjustment module 122 may adjust the angling of the two electromagnetic poles of the first magnetic pair 130 with respect to the Y axis.

The tilt module 123 may adjust the elevation angling of the two electromagnetic poles of the first magnetic pair 130 with respect to the Z axis.

Referred to FIG. 1, the energy generating unit 14, the adjustment module 12, and the magnetism unit 13 may be coupled on top of the target 15 in either a stationary or a mobile manner. The energy generating unit 14 may generate an energy beam 140, in which the energy beam 140 may be a laser beam, an electron beam, an electric arc, or a combination of at least two of the foregoing. The apparatus of this disclosure may be applied to selective laser sintering (SLS), selective laser melting (SLM), direct metal laser sintering (DMLS), or electron beam melting (EBM).

Figure 6:
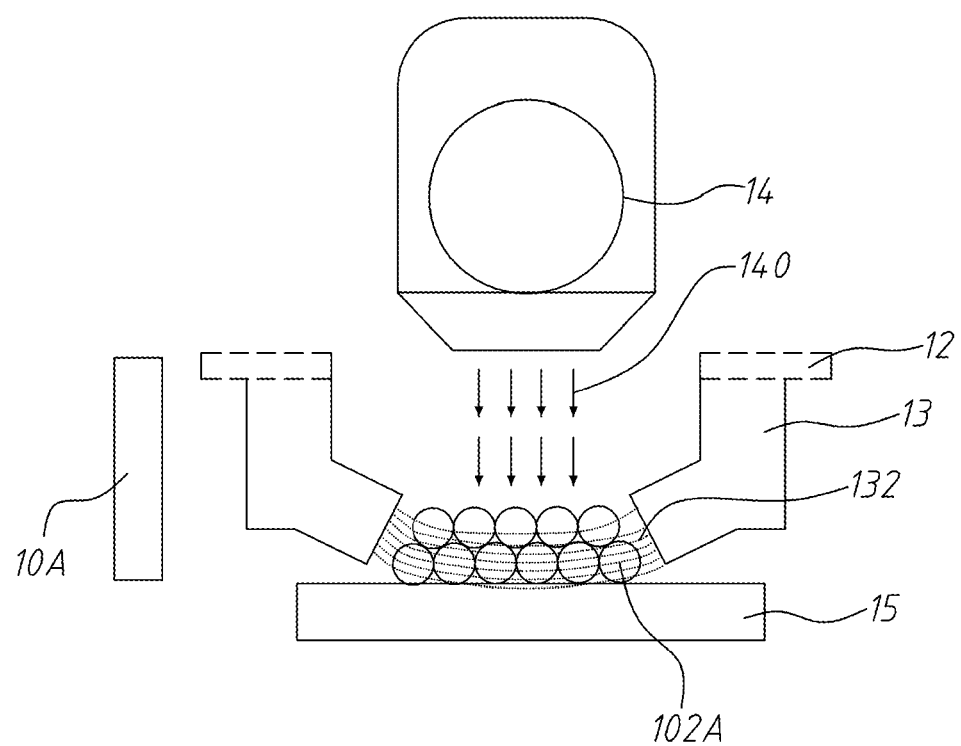
FIG. 6 is a schematic view of a second embodiment of the apparatus for adjusting and controlling the stacking-up layer manufacturing of this disclosure.

Referring now to FIG. 6, a second embodiment of the apparatus for adjusting and controlling the stacking-up layer manufacturing of this disclosure is schematically shown. By comparing this second embodiment to the aforesaid first embodiment, the major difference is that the powder providing unit 10A of the second embodiment may be selectively disconnected with the other elements, such as the displacement unit 11, the adjustment module 12, the magnetism unit 13, and the energy generating unit 14.

In this second embodiment, the powder providing unit 10A may be movably coupled on top of the target for providing a powder 102A onto the surface of the target 15. The powder providing unit 10A here is embodied again as, but not limited to, a knife-shape material providing module. In addition, the powder providing unit 10A may be moved independently. This second embodiment of the apparatus of this disclosure can be applied to selective laser sintering (SLS), selective laser melting (SLM), direct metal laser sintering (DMLS), or electron beam melting (EBM).

Figure 7:
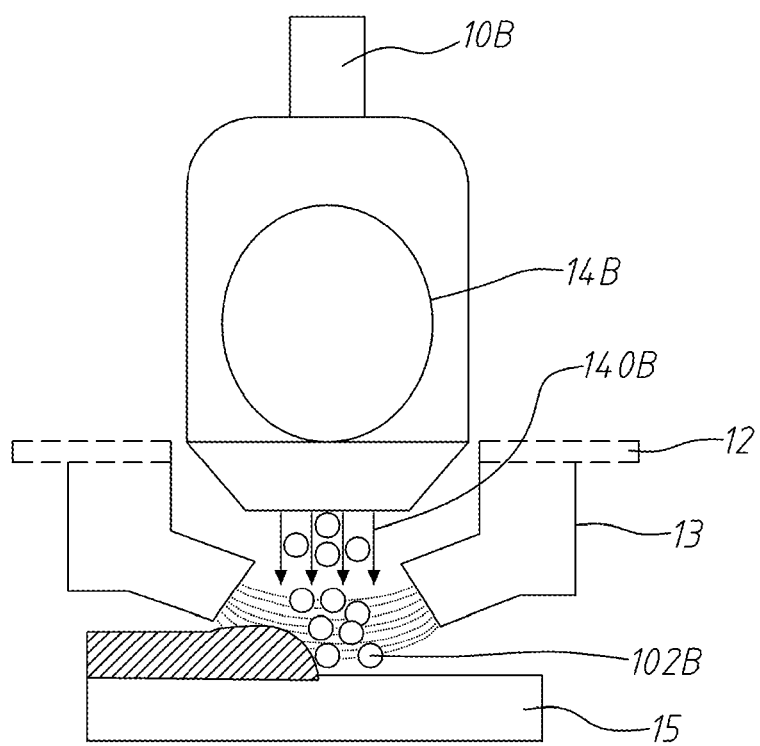
FIG. 7 is a schematic view of a third embodiment of the apparatus for adjusting and controlling the stacking-up layer manufacturing of this disclosure.

Referring now to FIG. 7, a third embodiment of the apparatus for adjusting and controlling the stacking-up layer manufacturing of this disclosure is schematically shown. By comparing this third embodiment to the aforesaid first embodiment, the major difference in between is that the third embodiment has the energy generating unit 14B and the powder providing unit 10B to replace the energy generating unit 14 and the powder providing unit 10 of the first embodiment. Except for this change, all other elements of these two embodiments such as the displacement unit 11, the adjustment module 12, the magnetism unit 13, and the target 15 are the same.

In this second embodiment, the powder providing unit 10B may be coupled with the energy generating unit 14B to provide the powder 102B onto the target 15. The powder providing unit 10B may be a hopper material providing module or a spray material providing module. The energy generating unit 14B may be movably coupled on top of the target 15, and may direct an energy beam 140B onto the surface of the target 15 so as to selectively melt or sinter a predetermined area of the powder into a melted or sintered state.

The magnetism unit 13 may provide a magnetic field to the melted or sintered powder layer during the solidification process so as to control the material microstructures. The aforesaid magnetic field may be a static magnetic field, an alternative magnetic field, or a pulse magnetic field. The apparatus of this embodiment can be applied to a process of laser engineering net shaping (LENS), laser metal deposition (LMD), or 3D laser cladding.

Figure 8:
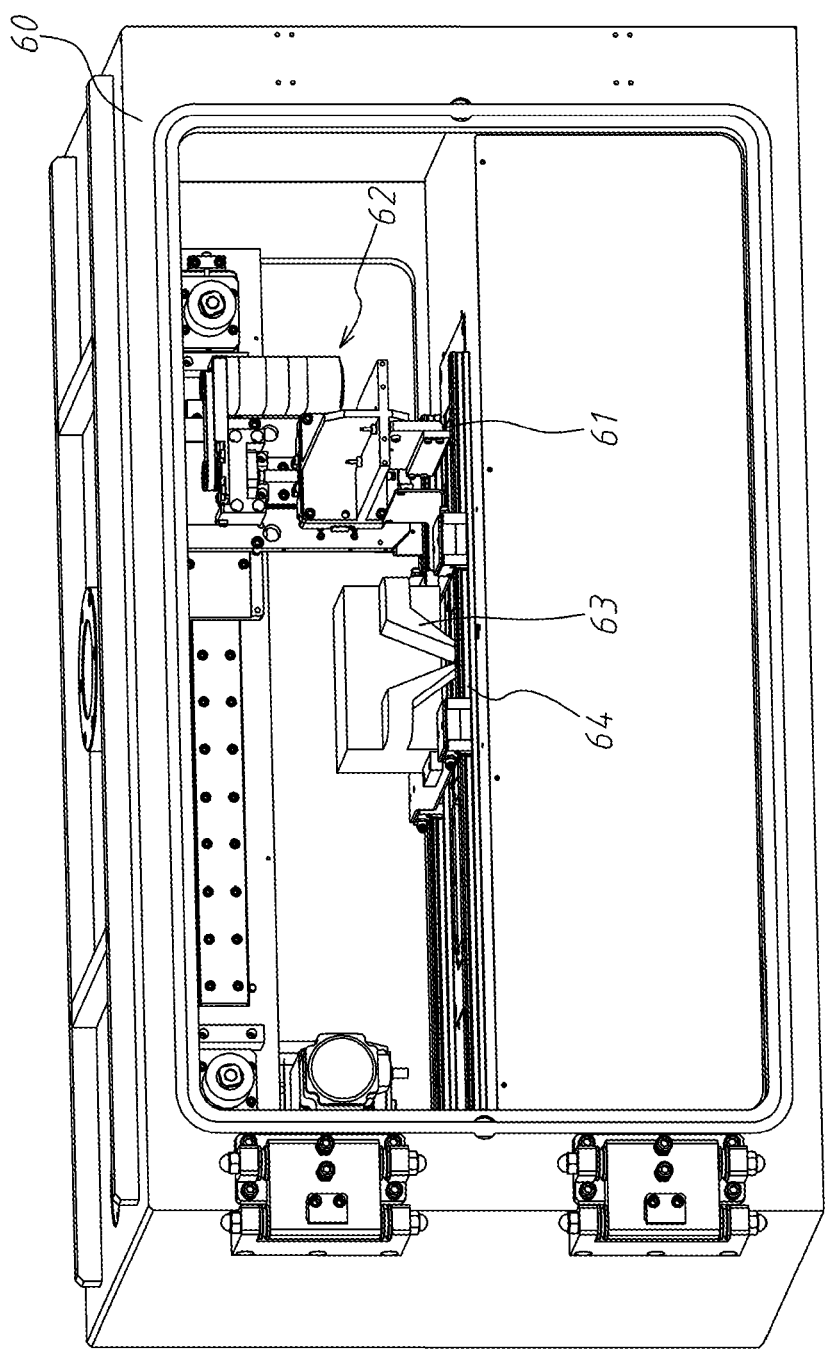
FIG. 8 is a schematic perspective of a fourth embodiment of the apparatus for adjusting and controlling the stacking-up layer manufacturing of this disclosure.

Referring now to FIG. 8, a fourth embodiment of the apparatus for adjusting and controlling the stacking-up layer manufacturing of this disclosure is schematically shown in this embodiment, the apparatus may comprise a station 60, a powder providing unit 61, a displacement unit 62, a magnetism unit 63, and a target 64.

The target 64 located inside the station 60 may perform a vertical reciprocation motion. The displacement unit 62 is located on top of the target 64 inside the station 60. In this embodiment, the displacement unit 62 may replace the aforesaid first Y-axis displacement module 101 and the displacement unit 11 of the first embodiment of FIG. 1, or simply the first Y-axis displacement module 101 of FIG. 1.

The powder providing unit 61 may be coupled with the displacement unit 62 to allow the powder providing unit 61 to perform a horizontal reciprocating motion with respect to the target 64. In this embodiment, the powder providing unit 61 further has a knife-shape powder providing unit, and the magnetism unit 63 coupled with the powder providing unit 61 may also be located on top of the target 64.

In FIG. 8, though the aforesaid energy generating unit is not configured, yet it should be understood that lots of common elements or interchangeable elements prevail among these embodiments of the present disclosure.

Referring now to FIG. 8, the powder providing unit 61 may provide a powder to the surface of the target 64 so as to form a layer of the powder on the target 64.

The displacement unit 62 may move the powder providing unit 61. In particular, the displacement unit 62 may move the powder providing unit 61 away from the target 64, and move the magnetism unit 63 to a top position of the target 64; such that the magnetism unit 63 may move accordingly, via the displacement unit 62, with respect to the varying of the focus position of the energy generating unit. In this embodiment, the magnetism unit 63 may be an electromagnetic member with two magnetic poles.

The energy generating unit may provide an energy beam to the powder on the target surface. The magnetism unit 63 may provide a magnetic field to the powder on the target surface; such that the powder on the surface of the target may be heated by the energy beam and then be formed to a melted or sintered state. During a solidification process of the melted or sintered powder layer, a mode, a direction, and a strength of the magnetic field are adjustable so as to control the material microstructure of a solidified layer after the solidification process.

In this embodiment, the magnetic field may be a static magnetic field, an alternative magnetic field or a pulse magnetic field.

As long as the solidified layer is formed, the target 64 was lowered by a predetermined distance, then the powder providing unit is introduced again to provide the powder to the target 64, and the same manufacturing steps are performed again to form another solidified layer toping on the previous one. According to this disclosure, the aforesaid steps of forming the solidified layer are performed repeatedly, till a predetermined 3D product is formed by stacking a plurality of solidified layers. This embodiment of the apparatus of this disclosure may be applied to selective laser sintering (SLS), selective laser melting (SLM), direct metal laser sintering (DMLS), or electron beam melting (EBM).

Figure 9:
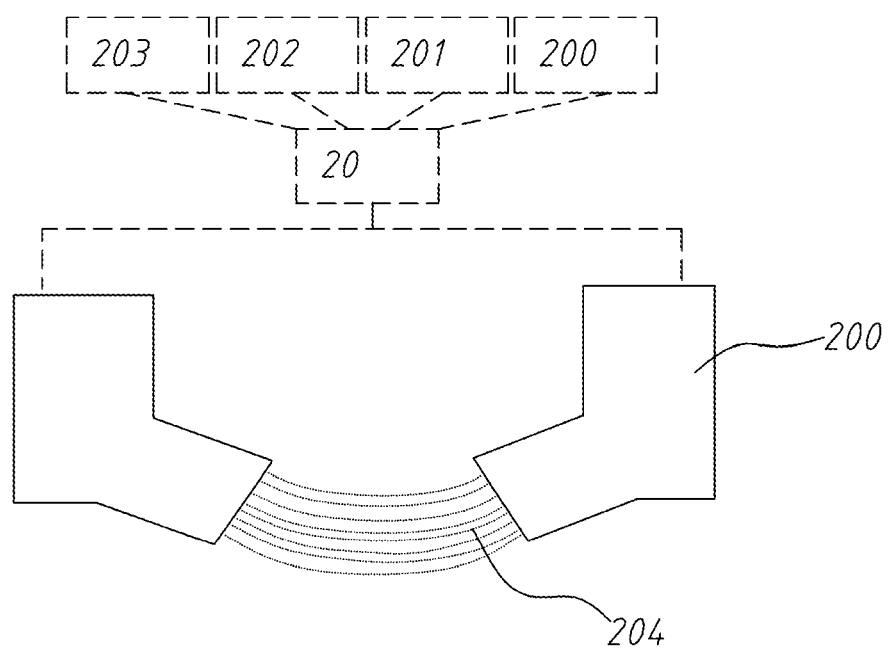
FIG. 9 is a schematic view of an embodiment of the magnetism unit of this disclosure.

Referring now to FIG. 9, a schematic view of an embodiment of the magnetism unit 20 of this disclosure is schematically shown. According to the disclosure, the magnetism unit for the apparatus for adjusting and controlling the stacking-up layer manufacturing may generate an alternative magnetic field, a pulse magnetic field, or a static magnetic field. The magnetism unit 20 may comprise at least one electromagnetic module 200, a cooling module 201, a switch module 202, and a power supply module 203.

The electromagnetic module 200, may be coupled with the cooling module 201, and may be structured by an electromagnetic member having two magnetic poles, or at least one simple electromagnetic member.

The cooling module 201 for cooling the electromagnetic module 200 that generates the magnetic field 204 may be selected from a group consisting of an air-cooling apparatus, an atmosphere cooling apparatus, a water cooling apparatus, a medium cooling apparatus, a thermoelectric cooling module, a metal heat-dissipating apparatus, a heat-dissipating fin apparatus, a honeycomb heat sink apparatus, and any the like.

The switch module 202, may be coupled with the electromagnetic module 200, may switch the electromagnetic module 200 around an alternative mode, a pulse mode, and a DC static mode so as to generate an alternative magnetic field, a pulse magnetic field, and a static magnetic field, respectively.

The power supply module 203, may be coupled with the electromagnetic module 200, may provide a voltage and a current to control the strength of the magnetic field 204 of the electromagnetic module 200.

Figure 10:
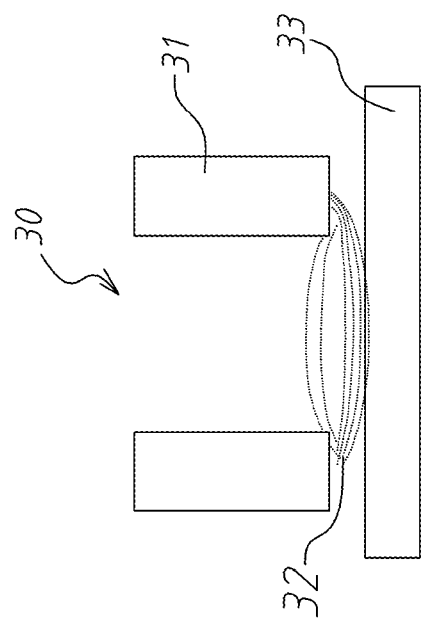
FIG. 10 is a schematic view of a further embodiment of the magnetism unit of this disclosure.

Referring now to FIG. 10, a schematic view of another embodiment of the magnetism unit 30 of this disclosure is shown. In this embodiment, the magnetism unit 30 for generating the alternative magnetic field, the pulse magnetic field or the static magnetic field may be located on top of the target 33. The magnetism unit 30 comprises two electromagnetic modules 31, located oppositely to each other in a symmetric way. As these two electromagnetic modules 31 may be energized, a magnetic field 32 may be formed in between.

Figure 11:
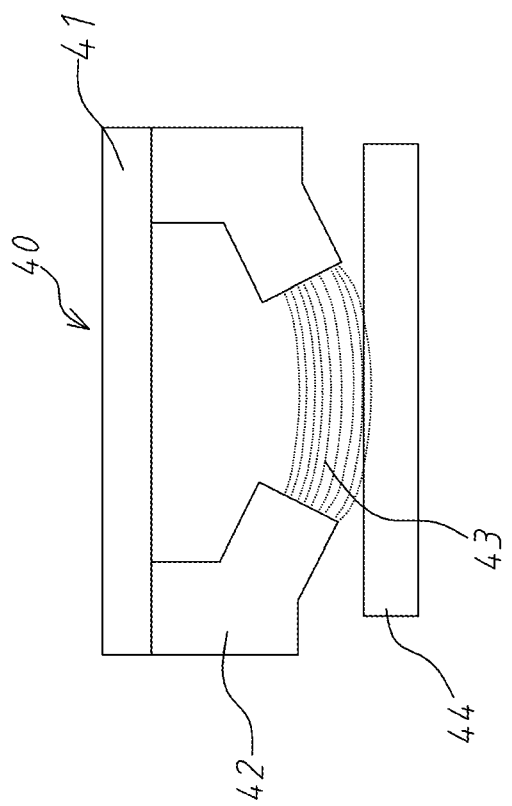
FIG. 11 is a schematic view of a further embodiment of the magnetism unit of this disclosure.

Referring now to FIG. 11, a schematic view of a further embodiment of the magnetism unit 40 of this disclosure is shown. In this embodiment, the magnetism unit 40 for generating the alternative magnetic field, the pulse magnetic field or the static magnetic field is located on top of the target 44. The magnetism unit 40 may comprise an electromagnetic module 41, and two electromagnetic poles 42 located under the electromagnetic module 41 in a symmetric opposing manner. As the electromagnetic module 41 may be energized, a magnetic field 43 may be formed between the two electromagnetic poles 42.

Figure 12:
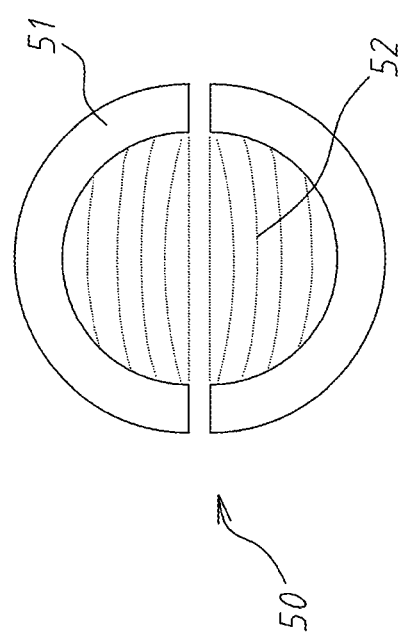
FIG. 12 is a schematic view of a further embodiment of the magnetism unit of this disclosure.

Referring now to FIG. 12, a schematic view of one more embodiment of the magnetism unit 50 of this disclosure is shown. In this embodiment, the magnetism unit 50 for generating the alternative magnetic field, the pulse magnetic field or the static magnetic field comprises two separate electromagnetic modules 51, each of which may be structured as a semi-circle to form a half of the circle. As the electromagnetic modules 51 is energized, a magnetic field 52 may be formed in the circle, namely between the two electromagnetic modules 51. In this embodiment, the electromagnetic module 51 may be treated as a magnetic pole, so that the induced magnetic field 52 is formed between these two pairing magnetic poles.

In all of the aforesaid embodiments of the magnetism units, the electromagnetic module may be embodied as, but not limited to, an electromagnet.

Figure 13:
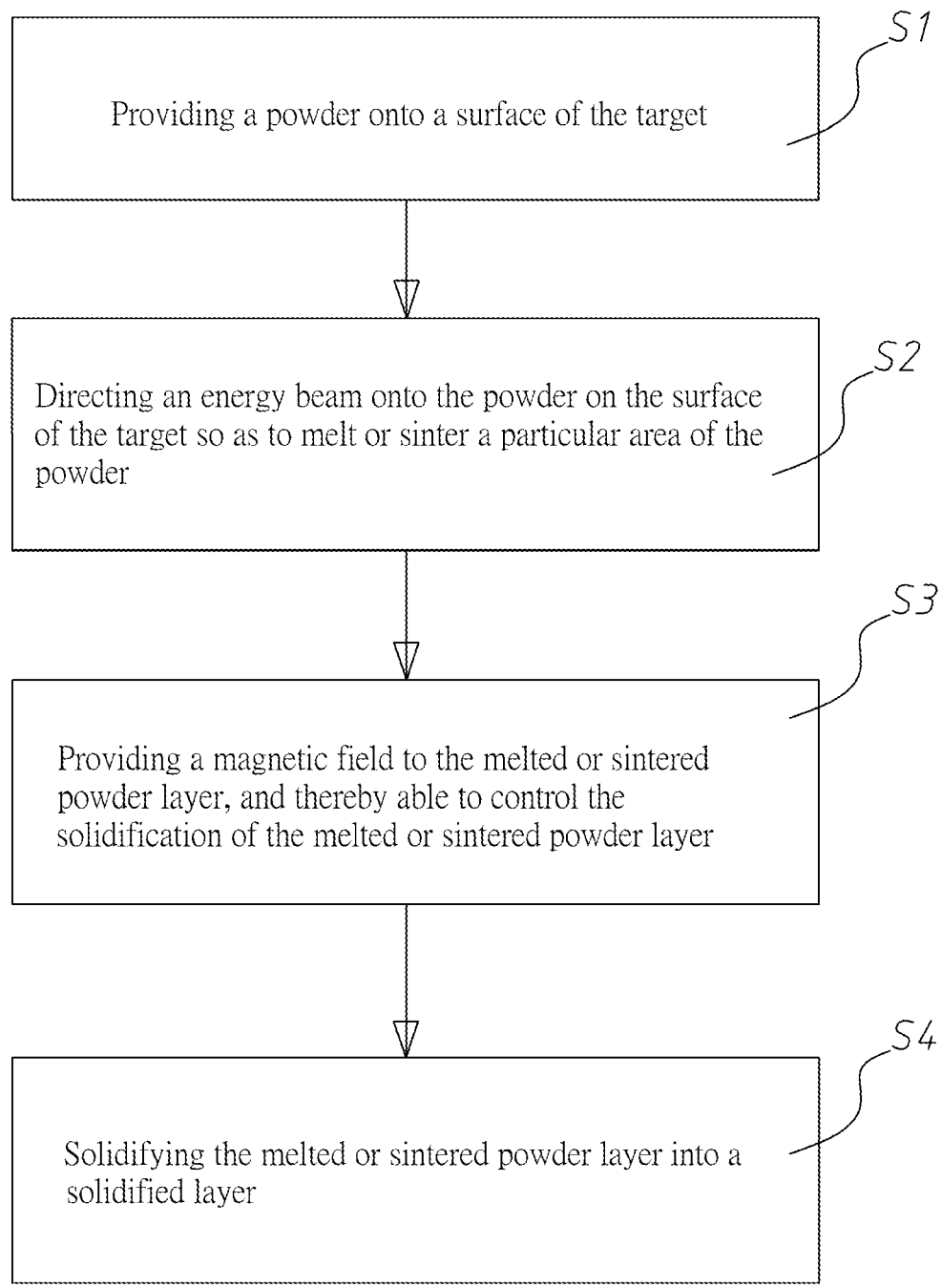
FIG. 13 is a flowchart of an embodiment of the method for adjusting and controlling the stacking-up layer manufacturing of this disclosure.

Referring now to FIG. 13, a flowchart of an embodiment of the method for adjusting and controlling the stacking-up layer manufacturing of this disclosure is shown. An apparatus to employ this method for adjusting and controlling the stacking-up layer manufacturing may comprise a target, a powder providing unit for providing powders onto the target, an energy generating unit for providing an energy beam and a magnetism unit for generating a magnetic field. The method comprises the following steps.

S1: Provide a powder onto a surface of the target thereon, in which the target may be selected from a group consisting of a plate, a platform, and a semi-finished product, and the powder may be selected from a group consisting of selected from a group consisting of a metal, an alloy, a metal-based composite, a polymer, a ceramic, a non-ferrous material, and any material formed by at least two of the foregoing materials In the first embodiment of the apparatus shown in FIG. 1, the powder providing unit 10 may be coupled with the displacement unit, the adjustment module 12, the magnetism unit 13 or the energy generating unit 14, and may provide the powder 102 to the surface of the target 15. In the embodiment of the method, the powder providing unit 10 may provide the powder to the surface of the target 15 by a method selected from a group consisting of spraying, depositing, rolling, leveling, laying, and a combination of at least two of the foregoing.

In the second embodiment of the apparatus shown in FIG. 6, the powder providing unit 10A may provide the powder 102A by laying to the surface of the target 15.

In the third embodiment of the apparatus shown in FIG. 7, the powder providing unit 10B, may be coupled with the energy generating unit 14B, and may provide the powder 102B by spraying to the surface of the target 15.

In the fourth embodiment of the apparatus shown in FIG. 8, the powder providing unit 61, may be coupled with the displacement unit 62, and may provide the powder to the surface of the target 64 via the horizontal reciprocating motion of the powder providing unit 61 with respect to the target 64.

In the aforesaid embodiments of the targets 15, 64, according to specific demands, the energy generating unit 13 and the powder providing unit 10, 10A, 10B, 61 may be moved in a correlated manner or in an independent manner.

S2: Direct an energy beam onto the powder on the surface of the target so as to melt or sinter a particular area of the powder, and may form a melted or sintered powder layer.

In the first embodiment of the apparatus shown in FIG. 1, while the energy generating unit 14 provides the energy beam 140 to the powder 102, the energy beam 140 may selectively heat the powder so as to have a particular area to form a melted or sintered powder layer. The method for the aforesaid melting or sintering may be selected from a group consisting of selective laser sintering (SLS), selective laser melting (SLM), direct metal laser sintering (DMLS), and electron beam melting (EBM).

In the second embodiment of the apparatus shown in FIG. 6, while the energy generating unit 14 provides the energy beam 140 to the powder 102A, the energy beam 140 may selectively heat the powder in a particular area to form a melted or sintered powder layer.

In the third embodiment of the apparatus shown in FIG. 7, while the energy generating unit 14B provides the energy beam 140B to the powder on the surface of the target, the energy beam 140 may selectively heat the powder in a particular area to form a melted or sintered powder layer.

In the fourth embodiment of the apparatus shown in FIG. 8, though the location of the energy generating unit is not shown, yet it may be understood that the energy beam may penetrate the spacing in the magnetism unit 63 so as to selectively melt or sinter the powder on the platform 64.

S3: Provide a magnetic field to the melted or sintered powder layer, and thereby able to control the solidification of the melted or sintered powder layer.

In the first embodiment of the apparatus shown in FIG. 1, the magnetism unit 13 may provide the magnetic field 132 to the melted or sintered powder layer, so that the material microstructure may be controlled during the solidification of the melted or sintered powder layer.

In the second embodiment of the apparatus shown in FIG. 6, the magnetism unit 13 may provide a magnetic field 132 to the melted or sintered powder layer 102A, so that material microstructure may be controlled during the solidification of the melted or sintered powder layer.

In the third embodiment of the apparatus shown in FIG. 7, the magnetism unit 13 may provide a magnetic field 132 to the melted or sintered powder layer. In his embodiment, the powder providing unit 10B is a spray material providing module located in the energy generating unit 14B. As the energy generating unit 14B heats the powder, the powder providing unit 10B keeps providing the powder 102B onto the surface of the target 15.

In the fourth embodiment of the apparatus shown in FIG. 8, the magnetism unit 63 may provide a magnetic field to the melted or sintered powder layer over the surface of the target 64.

In this disclosure, the aforesaid Steps S2 and S3 may be executed synchronously, or may be performed in order.

S4: The melted or sintered powder layer is thus solidified into a solidified layer. Then, go back to perform Steps S1 through S3. According to the predetermined 3D sliced layers, the method keeps repeatedly performing Steps S1 through S3, till a plurality of the solidified layers may be accumulated or laminated to form the desired 3D product.

In the first, second and fourth embodiments of the apparatus shown respectively in FIG. 1, FIG. 6 and FIG. 8, the method for the aforesaid melting or sintering may be selected from a group consisting of selective laser sintering (SLS), selective laser melting (SLM), Direct metal laser sintering (DMLS), and electron beam melting (EBM).

In the third embodiment of the apparatus shown in FIG. 7, the aforesaid manufacturing process for forming the melted or sintered powder layer may be a process of laser engineering net shaping (LENS), laser metal deposition (LMD), or 3D laser cladding.

In summary, this disclosure introduces the technique of controlling the crystal size by varying or controlling the magnetic field, such that the magnetic field applied upon the melted or sintered powder layer may be controlled to form satisfied microstructures in the solidified layers as well as in the 3D product.

In this disclosure, the magnetic field may be an alternative magnetic field, a pulse magnetic field, or a static magnetic field, and a strength of the magnetic field is approximately ranged from 0.001 Tesla (T) to 3,000 T. Following equations demonstrate, typically but not limited to, a possible physical mechanism of the solidification under the alternative magnetic field or the pulse magnetic field.

$$P = B_o JL \sin(\omega t) \qquad \text{(Equation 1)}$$

$$P_v = P_{vo} + kd^{-1/2} \qquad \text{(Equation 2)}$$

in which P is the pressure of the electromagnetic vibrator, $\omega$ is the alternative frequency, $B_o$ is the strength of the magnetic field, J is the induced current, and d is the crystal size.

Obviously, under the influence of the alternative magnetic field or the pulse magnetic field, the pressure of the electromagnetic vibrator, the magnetic field, the induced current, and the alternative frequency are all correlated. In particular, as the strength of the magnetic field and the alternative frequency increase, the pressure of the electromagnetic vibrator is increased as well.

Figure 14:
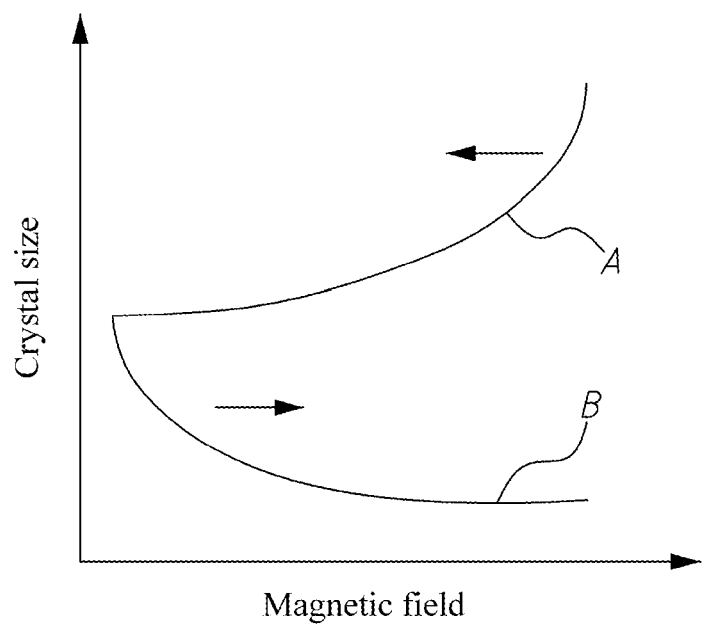
FIG. 14 is a diagram showing the relationship between the crystal size and the magnetic field.
Figure 15:
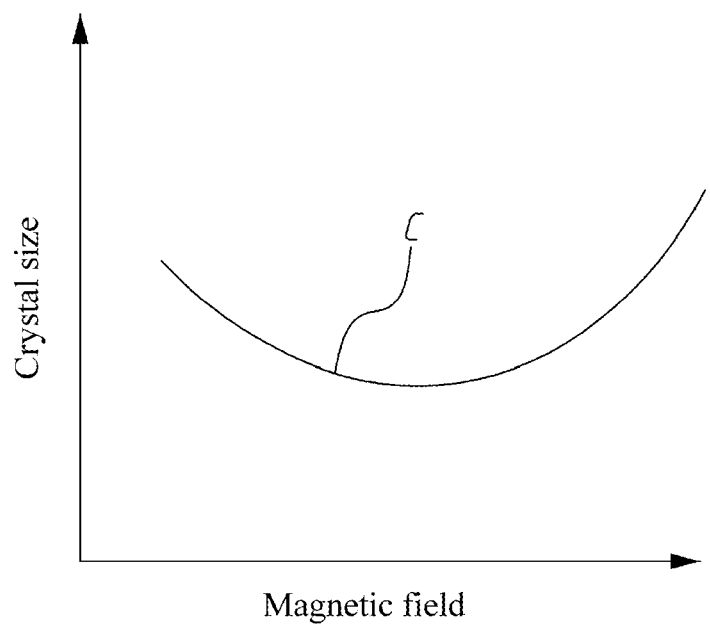
FIG. 15 is another illustration of FIG. 14, in which curve C is a combination of curves A and B of FIG. 14.

Refer now to FIG. 14 and FIG. 15, in which Curve A demonstrates a typical Joule heating effect, Curve B demonstrates the corresponding electromagnetic vibration, and Curve C is the sum of Curve A and Curve B.

Under the efforts of the electromagnetic vibration and the Joule heating effect under the alternative magnetic field or the pulse magnetic field, as the magnetic field is initiated, the effect of the electromagnetic vibration upon the magnetic field is significant. The grain growth may be restricted and form a fine grain or amorphous microstructure as the strength of magnetic field increase. However, as the magnetic field is too strong, the Joule heating effect may prolong the required cooling time during the solidification, such that the crystal size may increase and form a coarse grain. The effects of the microstructure variation may be dependent to the material properties. Thus, the apparatus for controlling the magnetic field in this disclosure may control the solidification of melted or sintered layers to vary the final micro structure.

Following equations demonstrate, typically but not limited to, a possible physical mechanism of the solidification under the static magnetic field.

$$v_l = aJ^2 \qquad \text{(Equation 3)}$$

$$a = \frac{\rho_L \beta g (2R)^4}{144 \mu_v \lambda_L k_e^L} \qquad \text{(Equation 4)}$$

in which $\rho_L$ is the density of the liquid-phase metal, $\beta$ is the expansion coefficient, g is gravity acceleration, R is the radius of the melted body, $\mu_v$ is the viscosity coefficient, $\lambda_L$ is the heat-transfer coefficient, and $v_l$ is the velocity of the liquid-phase metal.

Apparently, as velocity of the liquid-phase metal driven by the static electromagnetic field is larger than the shifting speed of the solid-liquid interface during the solidification, the crystallization orientation may be affected and driven by the static electromagnetic field. At this time, the instant shifting speed of the solid-liquid interface in the liquid-phase metal is called the critical speed. In the case that the shifting speed of the solid-liquid interface driven by the static electromagnetic field is larger than the critical speed, the crystallization direction of the microstructure of the material in the stacking-up layer manufacturing would be driven by the magnetic field.

By providing the apparatus and the method for adjusting and controlling the stacking-up layer manufacturing in accordance with the foregoing disclosure, the product with complicated shape and controllable crystallization orientation by conventional techniques in the art may then be produced.

With respect to the above description then, it is to be realized that the optimum factors relationships for the parts of the disclosure, to comprise variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A method for adjusting and controlling the stacking-up layer manufacturing, comprising the steps of:
   (a) providing a powder onto a surface of a target;
   (b) directing an energy beam onto the powder on the surface of the target to form a melted or sintered powder layer;
   (c) applying a magnetic field to the melted or sintered powder layer so as to control a solidification process of the melted or sintered powder layer, and further to form a solidified layer, wherein a material microstructure of the solidified layer is varied via controlling the solidification process, wherein step (c) further comprises the steps of:
      providing an adjustment module, coupled with a magnetism unit and a displacement unit, wherein the magnetism unit is disposed within the adjustment module, wherein the adjustment module is disposed within the displacement unit;
      wherein the adjustment module further comprises:
         a turning module, coupled to the displacement unit;
         a protrusion module, coupled to the turning module;
         an angular adjustment module, coupled to the protrusion module; and
         a tilt module, coupled to the angular adjustment module,
      wherein the magnetism unit is coupled with the tilt module and further comprises a first magnetic pair having two electromagnetic poles, wherein the magnetism unit applies the magnetic field;
      rotating the magnetism unit around an Z axis by the turning module;
      adjusting a distance between the two electromagnetic poles of the first magnetic pair by the protrusion module;
      adjusting an angle of the two electromagnetic poles of the first magnetic pair with respect to a Y axis by the angular adjustment module;
      adjusting an elevation angle of the two electromagnetic poles of the first magnetic pair with respect to the Z axis by the tilt module; and
   (d) performing repeatedly the steps (a), (b), and (c) till a 3D product is formed by a sequence stacking with the solidified layers.

2. The method for adjusting and controlling the stacking-up layer manufacturing of claim 1, wherein a mode, a direction, and a strength of the magnetic field are adjustable so as to control the material microstructure of the solidified layer.

3. The method for adjusting and controlling the stacking-up layer manufacturing of claim 1, wherein the stacking-up layer manufacturing is selected from a group consisting of selective laser sintering (SLS), selective laser melting (SLM), electron beam melting (EBM), direct metal laser sintering (DMLS), and a method belong to any powder bed fusion additive manufacturing process.

4. The method for adjusting and controlling the stacking-up layer manufacturing of claim 1, wherein the method is selected from a group consisting of laser engineering net shaping (LENS), 3D laser cladding, laser metal deposition (LMD), and a method belong to any direct energy deposition additive manufacturing process.

5. The method for adjusting and controlling the stacking-up layer manufacturing of claim 1, wherein a material of the powder is selected from a group consisting of a metal, an alloy, a metal-based composite, a polymer, a polymer-based composite, a ceramic, a ceramic-based composite, and a combination thereof.

6. The method for adjusting and controlling the stacking-up layer manufacturing of claim 1, wherein the energy beam is selected from a group consisting of a laser beam, an electron beam, an electric arc, and a combination thereof.

7. The method for adjusting and controlling the stacking-up layer manufacturing of claim 1, wherein the powder is coated onto the surface of the target by a method selected from a group consisting of spraying, depositing, rolling, leveling, laying, and a combination thereof.

8. The method for adjusting and controlling the stacking-up layer manufacturing of claim 1, wherein a strength of the magnetic field is approximately ranged from 0.001 Tesla (T) to 3,000 T.

9. A control method for an apparatus for adjusting and controlling the stacking-up layer manufacturing, the apparatus comprising a target, a powder providing unit for providing a powder onto the target, an energy generating unit for providing an energy beam and a magnetism unit for generating a magnetic field, the control method comprising the steps of:
   (a) providing the powder onto a surface of the target;
   (b) directing the energy beam onto the powder on the surface of the target to form a melted or sintered powder layer;
   (c) applying the magnetic field to the melted or sintered powder layer so as to control a solidification process of the melted or sintered powder layer and further to form a solidified layer, wherein a material microstructure of the solidified layer is varied via controlling the solidification process, wherein step (c) further comprises the steps of:
      providing an adjustment module, coupled with a magnetism unit and a displacement unit, wherein the magnetism unit is disposed within the adjustment module, wherein the adjustment module is disposed within the displacement unit;
      wherein the adjustment module further comprises:
         a turning module, coupled to the displacement unit;
         a protrusion module, coupled to the turning module;
         an angular adjustment module, coupled to the protrusion module; and
         a tilt module, coupled to the angular adjustment module,
      wherein the magnetism unit is coupled with the tilt module and further comprises a first magnetic pair having two electromagnetic poles, wherein the magnetism unit applies the magnetic field;
      rotating the magnetism unit around an Z axis by the turning module;
      adjusting a distance between the two electromagnetic poles of the first magnetic pair by the protrusion module;
      adjusting an angle of the two electromagnetic poles of the first magnetic pair with respect to a Y axis by the angular adjustment module;

adjusting an elevation angle of the two electromagnetic poles of the first magnetic pair with respect to the Z axis by the tilt module; and (d) performing repeatedly the steps (a), (b), and (c) till a 3D product is formed by a sequence stacking with the solidified layers.

10. The control method for an apparatus for adjusting and controlling the stacking-up layer manufacturing of claim 9, wherein a mode, a direction, and a strength of the magnetic field are adjustable so as to control a material microstructure of the solidified layer.

11. The control method for an apparatus for adjusting and controlling the stacking-up layer manufacturing of claim 10, wherein the stacking-up layer manufacturing is selected from a group consisting of selective laser sintering (SLS), selective laser melting (SLM), direct metal laser sintering (DMLS), electron beam melting (EBM), and a method belong to any powder bed fusion additive manufacturing process.

12. The control method for an apparatus for adjusting and controlling the stacking-up layer manufacturing of claim 10, wherein the method is selected from a group consisting of laser engineering net shaping (LENS), 3D laser cladding, laser metal deposition (LMD), and a method belong to any direct energy deposition additive manufacturing process.

13. The control method for an apparatus for adjusting and controlling the stacking-up layer manufacturing of claim 10, wherein a material of the powder is selected from a group consisting of a metal, an alloy, a metal-based composite, a polymer, a polymer-based composite, a ceramic, a ceramic-based composite, and a combination thereof.

14. The control method for an apparatus for adjusting and controlling the stacking-up layer manufacturing of claim 10, wherein the energy beam is selected from a group consisting of a laser beam, an electron beam, an electric arc, and a combination thereof.

15. The control method for an apparatus for adjusting and controlling the stacking-up layer manufacturing of claim 10, wherein a strength of the magnetic field is approximately ranged from 0.001 Tesla (T) to 3,000 T.

* * * * *